US011853697B2

(12) United States Patent
Li et al.

(10) Patent No.: US 11,853,697 B2
(45) Date of Patent: Dec. 26, 2023

(54) DYNAMICALLY INHERITING ACCUMULATED ATTRIBUTION

(71) Applicant: International Business Machines Corporation, Armonk, NY (US)

(72) Inventors: Shuo Li, Beijing (CN); June-Ray Lin, Taipei (TW); Sheng Yan Sun, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 17/238,515

(22) Filed: Apr. 23, 2021

(65) Prior Publication Data

US 2022/0343075 A1 Oct. 27, 2022

(51) Int. Cl.
*G06F 40/284* (2020.01)
*G06N 7/01* (2023.01)

(52) U.S. Cl.
CPC ............. *G06F 40/284* (2020.01); *G06N 7/01* (2023.01)

(58) Field of Classification Search
CPC .................................. G06F 40/284; G06N 7/01
See application file for complete search history.

(56) References Cited

U.S. PATENT DOCUMENTS

| 8,990,097 B2 | 3/2015 | Spivack |
| 2005/0060312 A1 | 3/2005 | Curtiss |
| 2016/0055157 A1 | 2/2016 | Morimoto |

FOREIGN PATENT DOCUMENTS

CN 110795657 A * 2/2020 ......... G06F 16/9535

OTHER PUBLICATIONS

Choubey et al., "Identifying the Most Dominant Event in a News Article by Mining Event Coreference Relations," Proceedings of the 2018 Conference of the North American Chapter of the Association for Computational Linguistics: Human Language Technologies, pp. 340-345, New Orleans, LA, Jun. 2018.
"Keyword Extraction," MonkeyLearn, Jan. 2021, 50 pages.
Agarwal et al., "MINT: A Tool to Explore Themes in High Velocity Social Media Data," EasyChair Preprint, No. 669, Dec. 2018, 16 pages.
Haghighati et al., "VARTTA: A Visual Analytics System for Making Sense of Real-Time Twitter Data," MDPI, Data 2020, 5, 20; doi:10.3390/data5010020, Feb. 2020, 25 pages.

* cited by examiner

*Primary Examiner* — Sonia L Gay
(74) *Attorney, Agent, or Firm* — Van Leeuwen & Van Leeuwen; Kimberly Zillig (57) ABSTRACT

An approach is provided in which a method, system, and program product build a time series prediction model based on one or more relationships between a first set of keywords in a set of first news articles and a second set of keywords in a set of second news articles. The time series prediction model includes a time-based interest level adjustment corresponding to a publication time between the set of first news articles and the set second of news articles. The method, system, and program product use the time series prediction model to compute an inherited initial interest level of a third news article that includes a set of new keywords based on the set of new keywords and the time-based interest level adjustment. The method, system, and program product assign the inherited initial interest level to the third news article.

25 Claims, 10 Drawing Sheets

DYNAMICALLY INHERITING ACCUMULATED ATTRIBUTION

BACKGROUND

People use news aggregator services on a daily basis to stay informed on current news. A news aggregator service is an application running on an electronic device that presents a continuous flow of links to articles organized from a multitude of publishers. Due to the enormous amount of daily new news articles, the news aggregator service depends on algorithms to identify, select, and sort the news articles based on article popularity and user interest.

News aggregator service algorithms automatically review content to determine a news article's quality and assess its page view placement based on a number of user clicks it receives, the trustworthiness of its publisher, the relevance of the story to a user's current geographical location, and the freshness of the news article (e.g., publication date and time).

News aggregator service algorithms use many factors to rank news articles, one of which is the click through rate (CTR) that indicates how many people are clicking on a particular article. High click through rates influence a news article's ranking and popularity, which indicates user preference and moves the news article higher in the page view placement. In short, the news article's interest level, or "temperature," is very important to the news article's page view placement.

A challenge found with existing systems is that the temperature of a newly published news article typically starts in a "cold" status. As such, because the news aggregator service algorithms typically rank articles based on their temperature, difficulties arise in ranking a newly published news article at the top of a page view. This creates a cyclical effect because if a newly published news article is low in rankings, users may not see the newly published news article and therefore will not select the newly published news article, which in turn keeps the temperature of the newly published news article in the cold status.

BRIEF SUMMARY

According to one embodiment of the present disclosure, an approach is provided in which a method, system, and program product build a time series prediction model based on one or more relationships between a first set of keywords in a set of first news articles and a second set of keywords in a set of second news articles. The time series prediction model includes a time-based interest level adjustment corresponding to a publication time between the set of first news articles and the set second of news articles. The method, system, and program product use the time series prediction model to compute an inherited initial interest level of a third news article that includes a set of new keywords based on the set of new keywords and the time-based interest level adjustment. The method, system, and program product assign the inherited initial interest level to the third news article.

According to another embodiment of the present disclosure, an approach is provided in the first set of keywords is a set of historical keywords, the set of first news articles is a set of historical news articles, the second set of keywords is a set of current news articles, the set of second news articles is a set of current news articles, and the third news article is an unpublished news article.

According to another embodiment of the present disclosure, an approach is provided in which a method, system, and program product group the set of historical keywords into a first set of topic groups comprising at least one first main topic group and at least one first subtopic group. The method, system, and program product group the set of current keywords into a second set of topic groups comprising at least one second main topic group and at least one second subtopic group. The method, system, and program product identify the one or more relationships based on mapping the first set of topic groups to the second set of topic groups.

According to another embodiment of the present disclosure, an approach is provided in which a method, system, and program product calculate a split keyword distance threshold and a long distance keyword threshold. The method, system, and program product purge one or more of the set of current keywords from the second set of topic groups based on the split keyword distance threshold. The method, system, and program product purge one or more of the set of current keywords from the second set of topic groups based on the long distance keyword threshold.

According to another embodiment of the present disclosure, an approach is provided in which a method, system, and program product define a first set of coordinates and a first interest level of the first set of topic groups. The method, system, and program product define a second set of coordinates and a second interest level of the second set of topic groups. The method, system, and program product determine a baseline interest level and the time-based interest level adjustment based on analyzing the first interest level against the second interest level. The method, system, and program product generate a time series heat map slice based on the baseline interest level and the time-based interest level adjustment. The method, system, and program product build the time series prediction model using the time series heat map slice.

According to another embodiment of the present disclosure, an approach is provided in which a method, system, and program product create a main topic new keyword heat list and a subtopic new keyword heat list, wherein the main topic new keyword heat list corresponds to a main topic new keyword heat value and the subtopic new keyword heat list corresponds to a subtopic new keyword heat value. The method, system, and program product configure one or more influence factors for the subtopic new keyword heat value to influence the main topic new keyword heat value. The method, system, and program product integrate the main topic new keyword heat list, the subtopic new keyword heat list, and the one or more influence factors into the time series prediction model.

According to another embodiment of the present disclosure, an approach is provided in which a method, system, and program product refresh the baseline interest level in response to receiving the third news article. The method, system, and program product use the refreshed baseline interest level by the time series prediction model during the computing of the inherited initial interest level.

According to another embodiment of the present disclosure, an approach is provided in which a method, system, and program product provide a list of recommended keywords to an author of the third news article in response based on the time series prediction model analyzing the third news article.

According to another embodiment of the present disclosure, an approach is provided in which a method, system, and program product retrieve the third news article by a news aggregator service. The method, system, and program product assign, by the news aggregator service, a page view placement to the third news article based on the inherited initial interest level.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
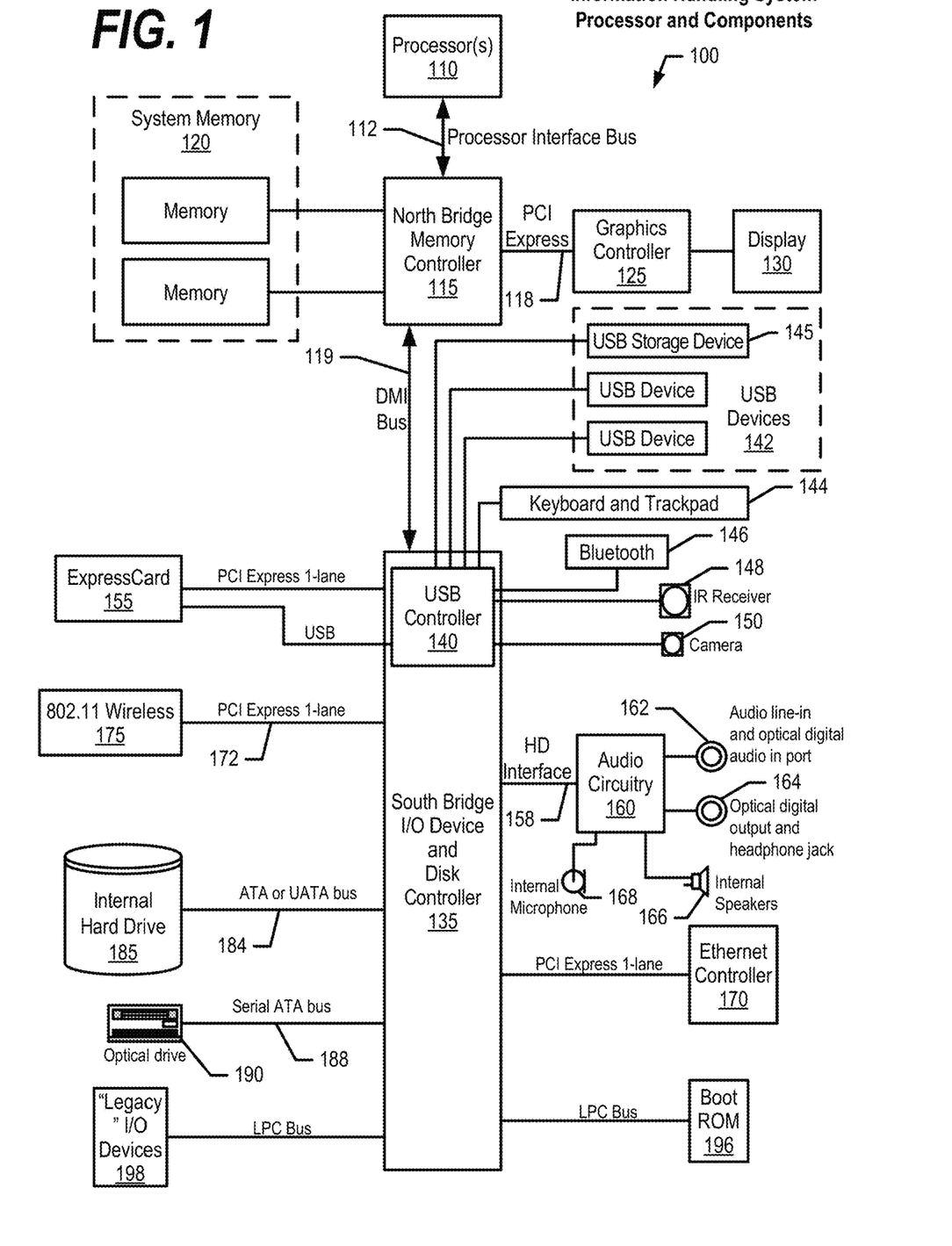
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, and etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
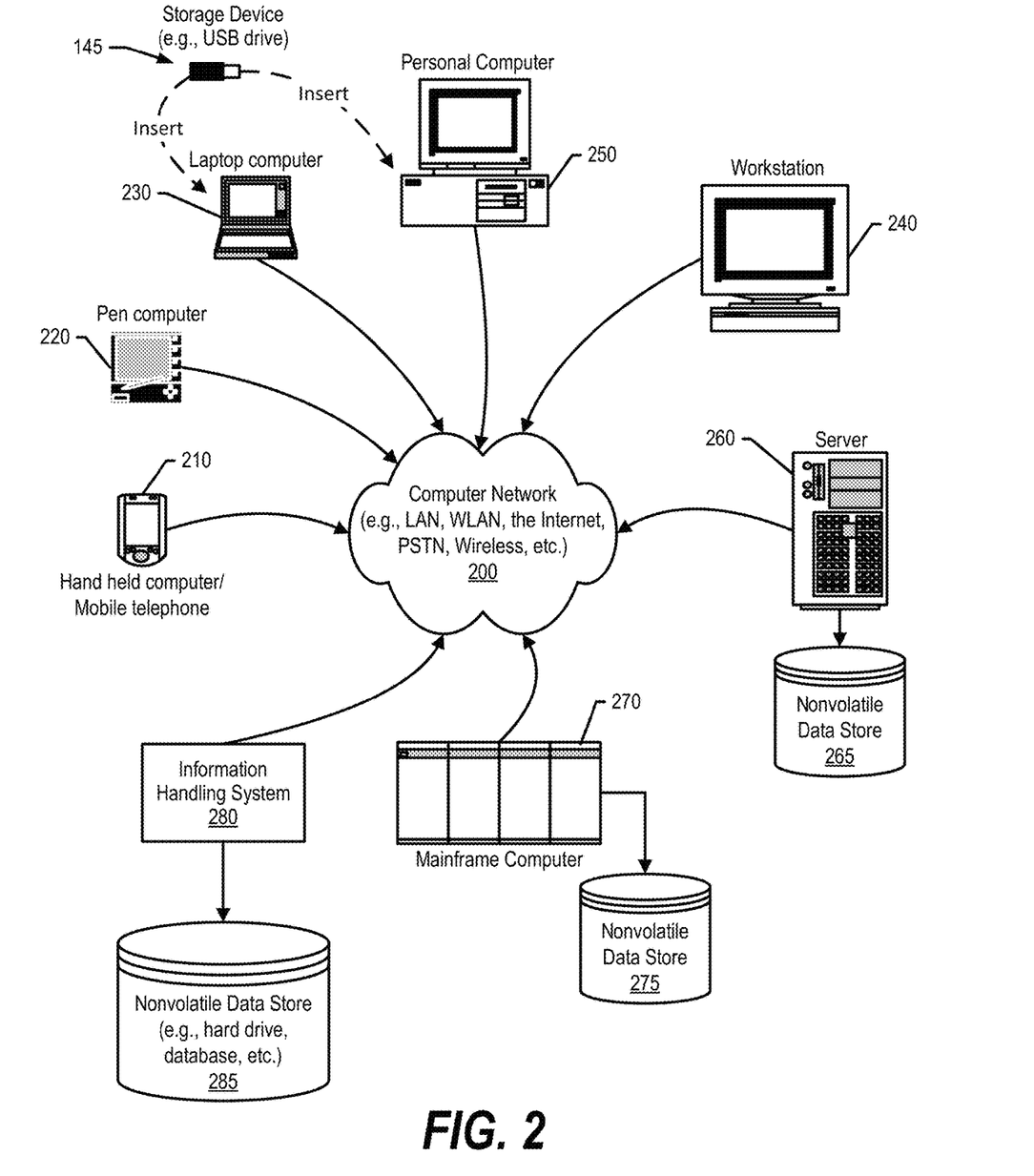
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a challenge found with existing systems is that the temperature of a new news article (e.g., a document), typically starts in a "cold" status. As such, because news aggregator service algorithms typically rank articles based on their temperature, difficulties arise in ranking the new news article towards the top of a page view placement. Several approaches exist to rank newly published news articles, but there is currently no efficient approach for a new news article to intelligently and dynamically "inherit" an initial temperature based on historical temperatures of similar, published news articles.

FIGS. 3 through 10 depict an approach that can be executed on an information handling system that analyzes an incoming new news article and applies an inherited initial interest level, also referred to herein as an "inherited initial heat level," to the new news article based on temperatures of similar existing news articles. As defined herein, the term "heat" is synonymous with "interest" and "interest level." The approach supports automatic adjustment without human intervention and complies with new media industry requirements. The approach also provides a fair presentation and keyword recommendations to authors on how to adjust their hot tag keywords to increase news article rankings. As defined herein, the term "keywords" applies to individual words and also applies to word phrases.

The approach builds up relationships between current news and historical news by performing general natural language processing steps on keywords to generate a closest new keywords list for future calculations. The approach calculates thresholds for split keyword distances and when the distance is larger than the threshold, the approach removes the corresponding keywords from a heat accumulation process to reduce computational complexity. The approach then builds up a heatmap for top tag keywords and builds a time series prediction model. As described herein, a heatmap (or heat map) is a data visualization technique that shows magnitude of a phenomenon as intensity in two dimensions, such as with color, shading, icon concentration, etc. The approach then uses the time series prediction model to assign an initial heat level to new news articles based on temperatures corresponding to similar current news articles.

Figure 3:
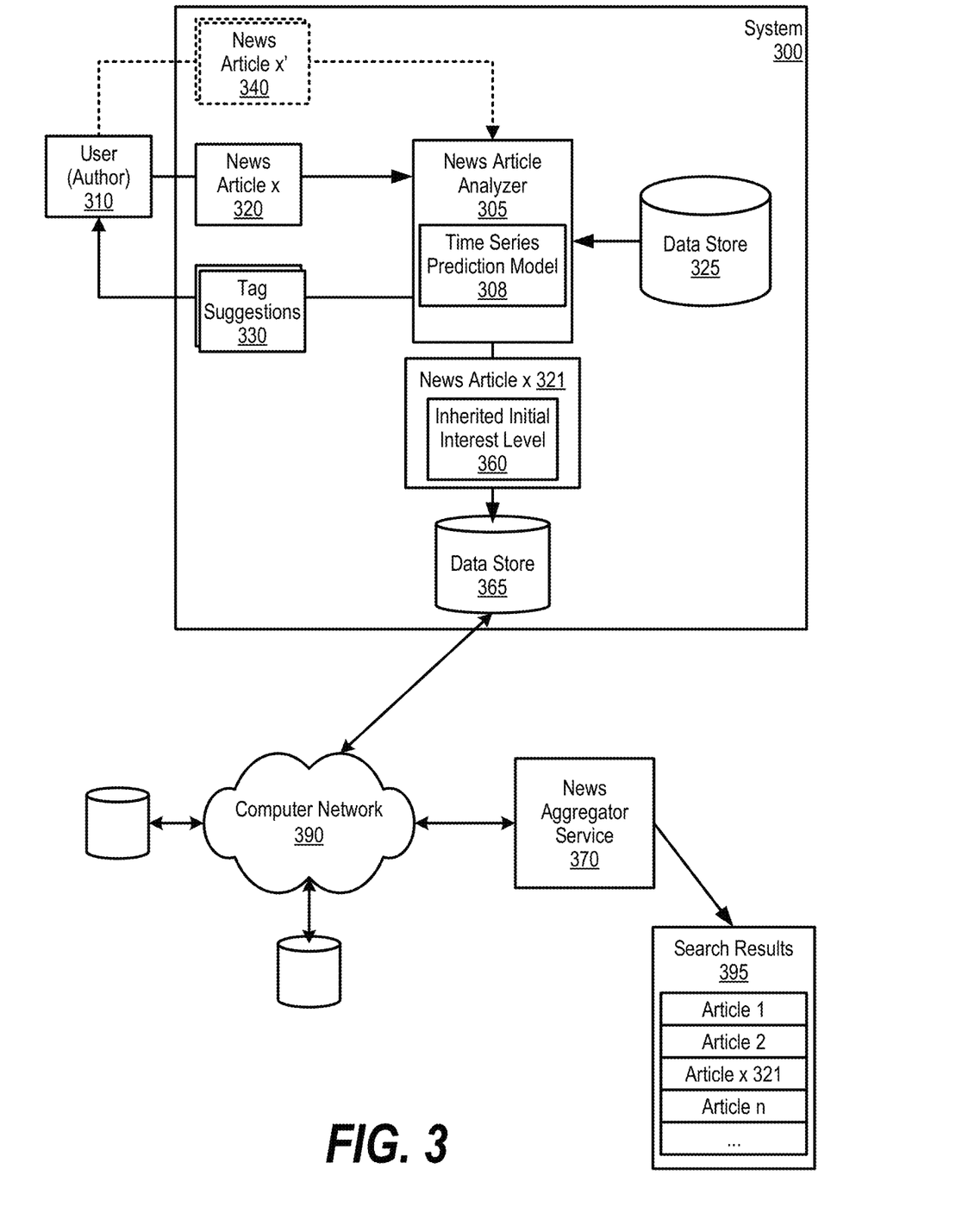
FIG. 3 is an exemplary diagram depicting a news article analyzer building a time series prediction model and assigning an inherited initial interest level to a new news article using the time series prediction model.

FIG. 3 is an exemplary diagram depicting a news article analyzer building a time series prediction model and assigning an inherited initial interest level to a new news article using the time series prediction model.

System 300 includes news article analyzer 305. News article analyzer 305 builds time series prediction model 308 based on historical keyword mappings and current keyword mappings from historical news articles and current news articles stored in data store 325. The building process, also referred to as a training process, begins by building up relationships between current news articles and historical news articles. This involves performing keywords processing for each tag in the various news articles and preparing a closest tag keyword list for future calculations. News article analyzer 305 then performs natural language processing steps to group main topic and subtopics; calculate thresholds for split keyword distances; and purge long distance words to reduce computational complexity (see FIG. 5 and corresponding text for further details).

News article analyzer 305 then builds up a heatmap for the top tag keywords and performs a keyword purge and processes boundaries with keyword relationships corresponding to main topic-subtopic groups. News article analyzer 305 then defines comprehensive coordinates for the hot keywords and ranks the hot keywords in a hot tag list. Then, news article analyzer 305 identifies baseline heat levels (baseline interest level) and heat velocity (time-based interest level adjustments) of the main topic-subtopic groups and generates a time series heat map slice. News article analyzer 305 then uses the time series heat map slice to build time series prediction model 308 accordingly (see FIG. 6 and corresponding text for further details). Once news article analyzer 305 finishes building time series prediction model 308, news article analyzer 305 is ready to receive new news articles (e.g., news article x 320).

News article analyzer 305 receives news article X 320 from user (author) 310. News article x 320 is a new news article that has not yet been published and therefore has a "cold" interest level. News article analyzer 305 uses time series prediction model 308 to identify key words in news article x 320 and correlate the identified keywords in news article x 320 to keywords found in current news articles and historical news articles. News article analyzer 305 then computes inherited initial interest level 360 based on the correlated keywords and assigns inherited initial interest level 360 to news article x 320, shown as news article x 321 in FIG. 3 (see FIG. 7 and corresponding text for further details).

In one embodiment, news article analyzer 305 provides tag suggestions 330 to author 310 so that author 310 can update news article x 320 to news article x' 340 and increase the chance of author 310's news article moving up in search results ranking by including tag suggestions 330 in news article x' 340. In this embodiment, news article analyzer 305 re-computes a new initial interest level and attaches a new inherited initial interest level 360 to news article x' 340 and stores the news article (x 320 or x' 360) as news article x 321 with its corresponding inherited initial interest level 360 in data store 365, which may be a local storage area or a cloud storage service. In one embodiment, inherited initial interest level 360 is computed using the following formula:

Recommended Heat=Total(#click+#forward+#comment+#tag post+#search present).

News aggregator service 370 trolls computer network 390 searching for news articles based on various criteria. When news aggregator service 370 detects news article x 321, news aggregator service 370 uses inherited initial interest level 360 as a basis for ranking news article x 321 appropriately in search results 395. In one embodiment, initial interest level 360 is a numerical value that news aggregator service 370 factors into page view placement sorting. As can be seen, news article x 321 appears towards the top of the page view placement of search results 395 even though news article x 321 is a newly published news article.

Figure 4:
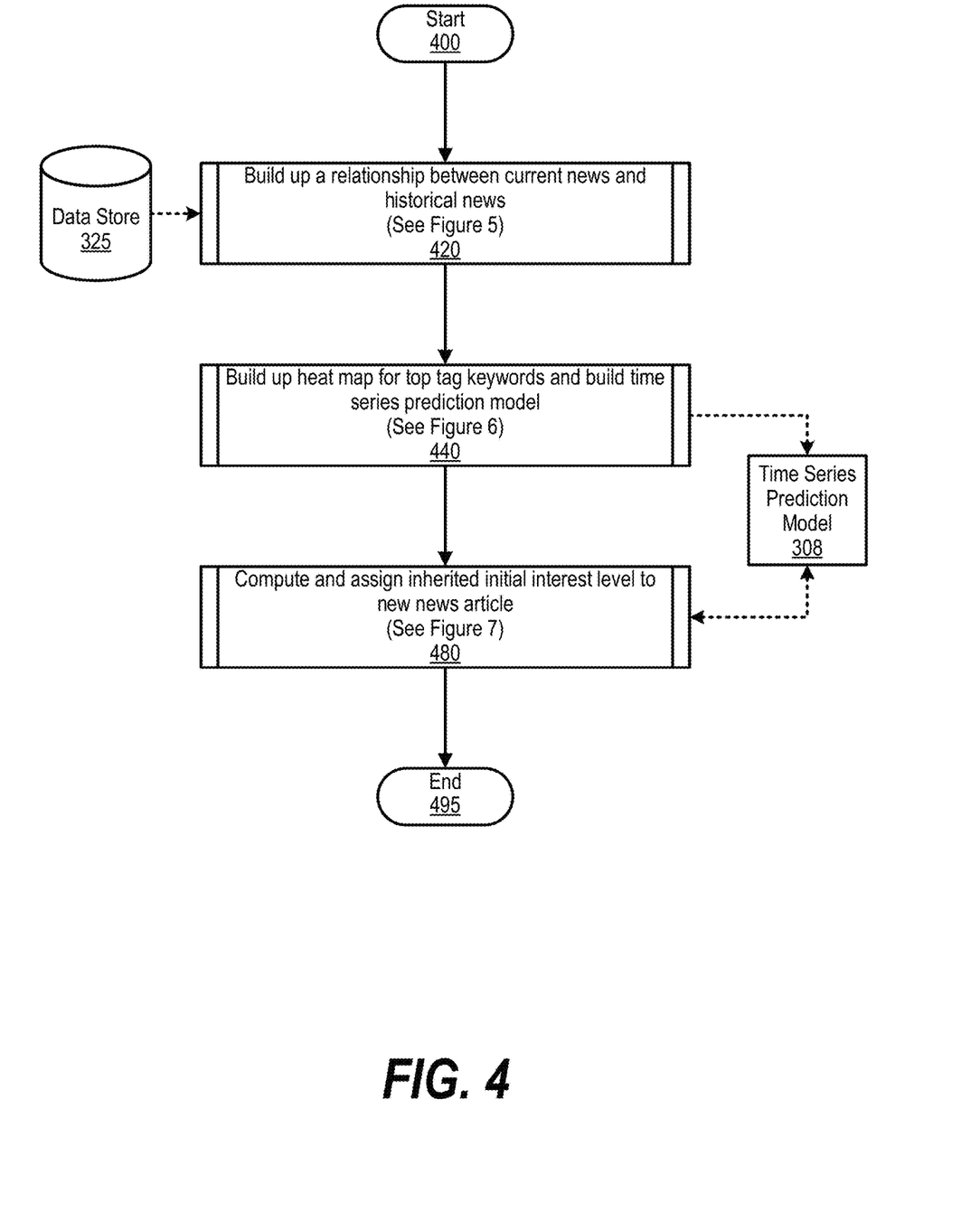
FIG. 4 is an exemplary high level flowchart depicting steps taken to build a time series prediction model and use the time series prediction model to assign an inherited initial interest level to a newly published news article.

FIG. 4 is an exemplary high level flowchart depicting steps taken to build a time series prediction model and use the time series prediction model to assign an inherited initial interest level to a newly published news article. FIG. 4 processing commences at 400 whereupon, at predefined process 420, the process builds up relationships between current news and historical news stored in data store 325 to establish a basis for how interest levels of keywords change over time (see FIG. 5 and corresponding text for processing details).

Figure 6:
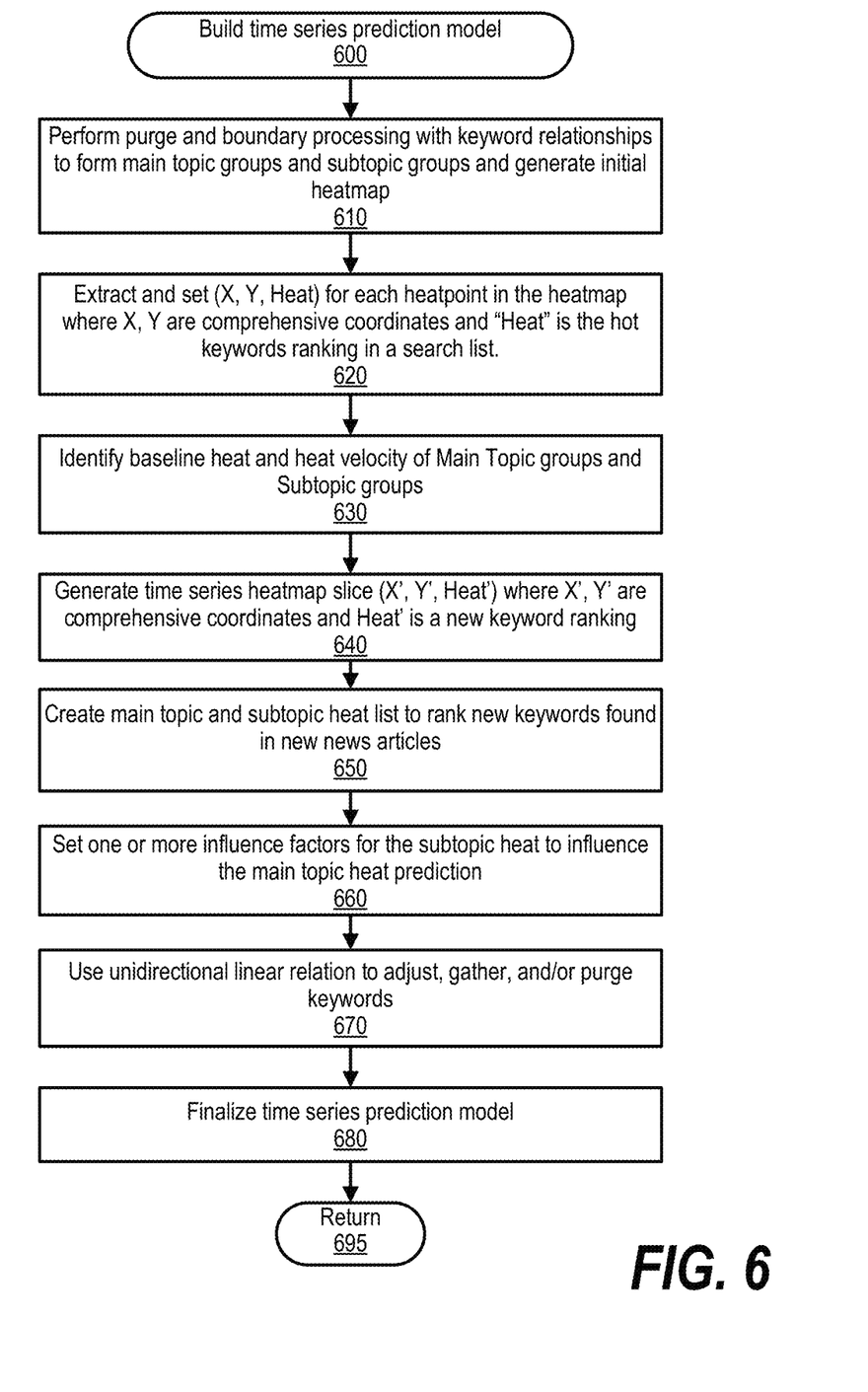
FIG. 6 is an exemplary flowchart depicting steps taken to build up a heat map for the top tag keywords and build a time series prediction model.

At predefined process 440, the process builds up a heat map for the top tag keywords and builds time series prediction model 308 using the top tag keywords (see FIG. 6 and corresponding text for processing details). At predefined process 480, the process uses time series prediction model 308 to compute and assign inherited initial interest levels to new news articles (see FIG. 7 and corresponding text for processing details). FIG. 4 processing thereafter ends at 495.

Figure 5:
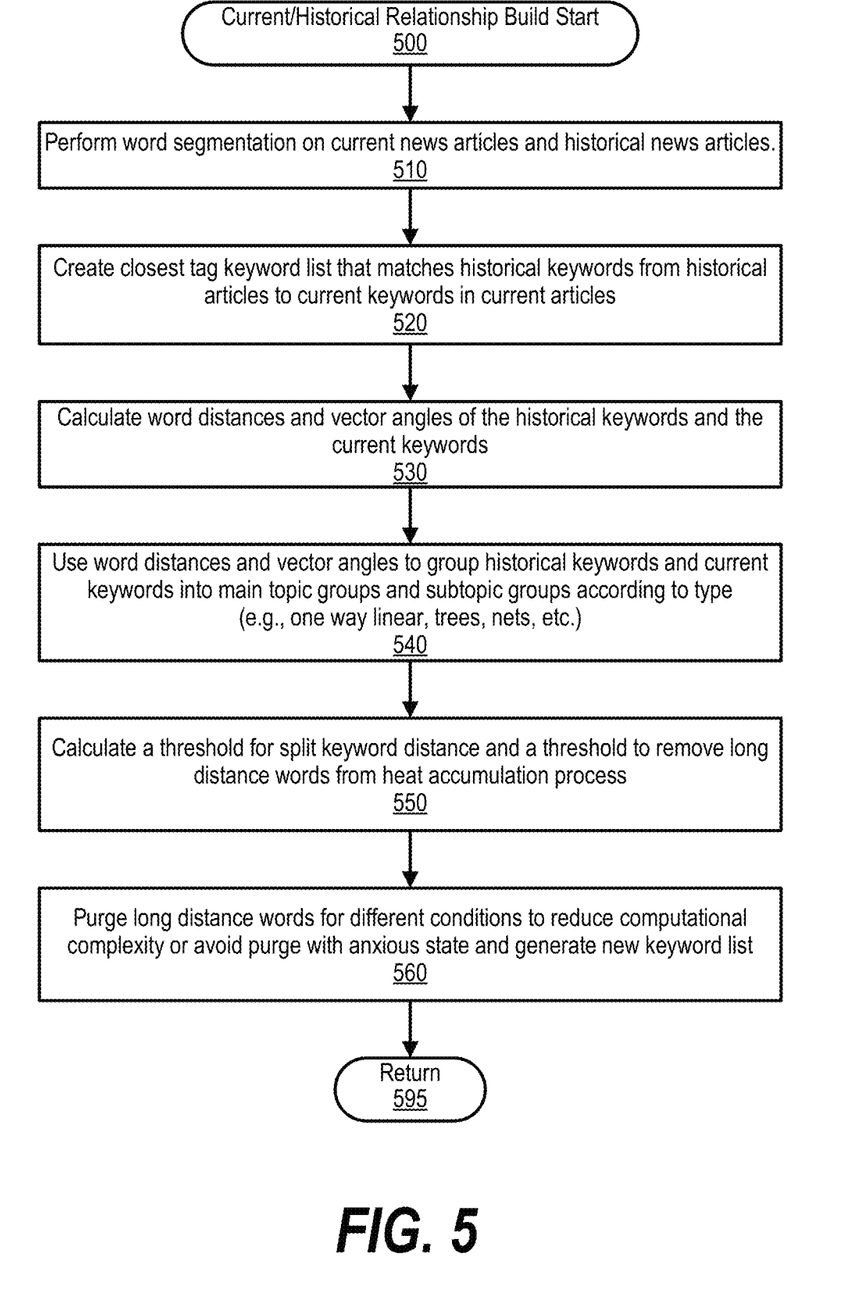
FIG. 5 is an exemplary flowchart depicting steps taken to build relationships between keywords in historical news articles and current news articles.

FIG. 5 is an exemplary flowchart depicting steps taken to build relationships between keywords in historical news articles and current news articles. Processing commences at 500 whereupon, at step 510, the process performs word segmentation that decomposes long texts such as sentences, paragraphs, and articles into data structures with words as units to facilitate subsequent processing and analysis.

Figure 8:
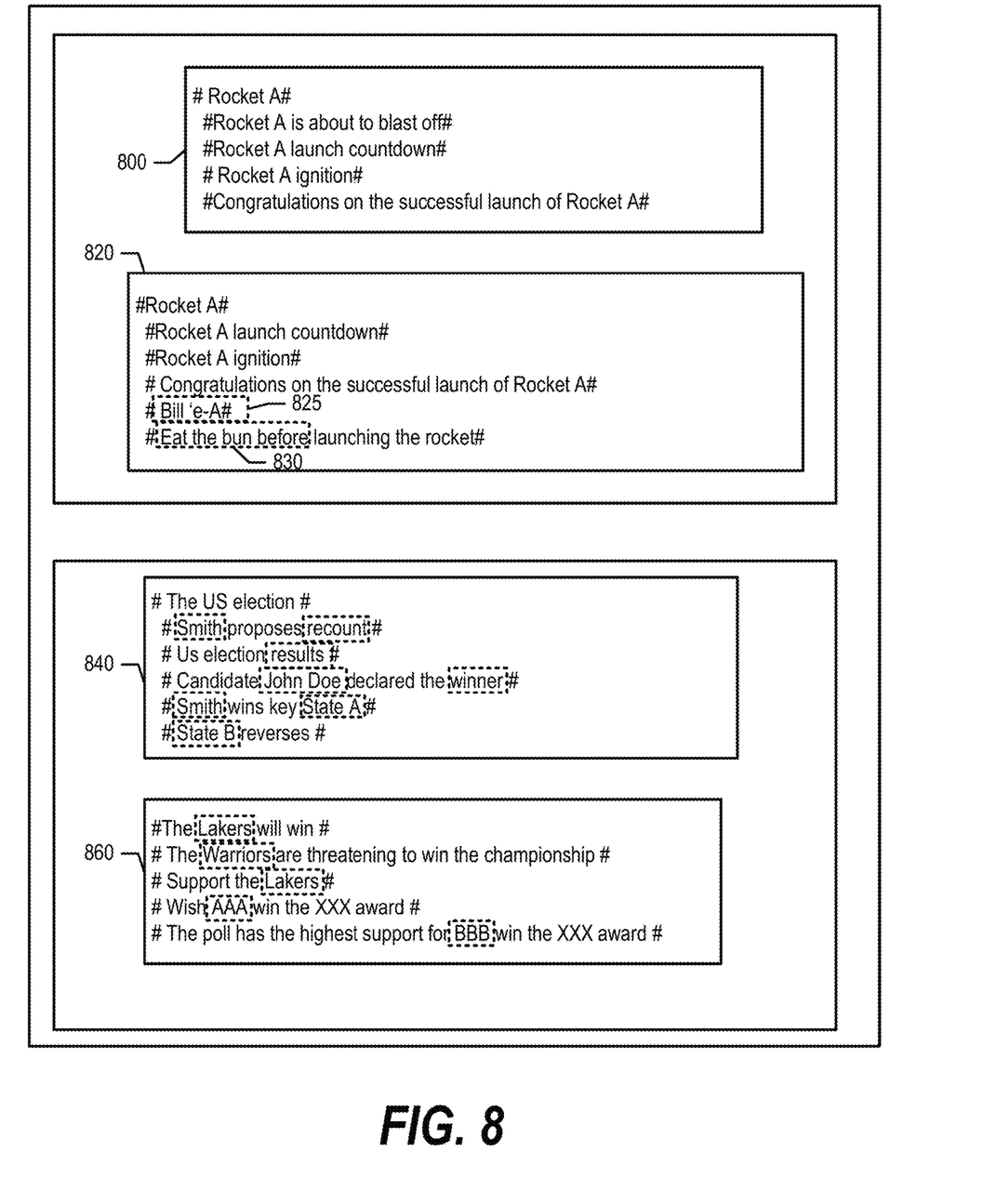
FIG. 8 is an exemplary diagram depicting various phrase groupings, adjustments, and purges during keyword analysis and grouping.

At step 520, the process creates a closest tag keyword list that matches historical keywords (in historical articles) to current keywords (in current articles). At step 530, the process calculates word distances and vector angles that include the historical keywords and the current keywords. At step 540, the process uses the word distances and vector angles to group historical keywords and current keywords into main topic groups and subtopic groups according to type (e.g., one way linear, trees, nets, etc.). Referring to FIG. 8, keywords 800 show a linear relationship, whereas keywords 840 show that different words are cross related.

In one embodiment, the process uses cosine similarity for steps 530 and 540. Cosine similarity is a measure of similarity between two non-zero vectors of an inner product space and is defined to equal the cosine of the angle between the two vectors. In this embodiment, the process uses the following formula to calculate the vector distance and angle:

$$r(\vec{u}, \vec{v}) = 1/d(\vec{u}, \vec{v}) = \|\vec{u} - \vec{v}\| = \sqrt{(u_1 - v_1)^2 + (u_2 - v_2)^2 \ldots (u_n - v_n)^2}$$

At step 550, the process calculates a threshold for split keyword distances and a threshold to remove long distance words from the heat accumulation process. In one embodiment, the process uses the following formula to compute a threshold of "E" for different "N" words at a distance of "r":

$$E = \frac{1}{N} \sum_{i=0}^{N} r_i$$

At step 560, based on the computed thresholds, the process purges long distance words for different conditions to reduce computational complexity or avoid purges with anxious state and generates a new keywords list. As described herein, "anxious state" terms are terms in opposite states but focus on the same topic, such as two teams in a playoff game. In one embodiment, the process purges long distance words from the whole set and uses the remaining set for convergence calculation requirements and performance improvements. In this embodiment, if two vectors have an angle greater than a certain value, the process removes one of the vectors from the similarity matrix. FIG. 5 processing thereafter returns to the calling routine (see FIG. 4) at 595.

FIG. 6 is an exemplary flowchart depicting steps taken to build up a heat map for the top tag keywords and build a time series prediction model. FIG. 6 processing commences at 600 whereupon, at step 610, the process performs purge and boundary processing with keyword relationships to form main topic groups and subtopic groups to generate an initial heatmap using the remaining set of keywords outputted from step 560 in FIG. 5.

At step 620, the process extracts and sets (X, Y, Heat) for each "heatpoint" in the heatmap where "X, Y" are comprehensive coordinates and "Heat" is the hot keywords ranking in a search list. At step 630, the process identifies a baseline heat (baseline interest level) and heat velocity (time-based interest level adjustment) of the main topic groups and the subtopic groups.

At step 640, the process generates a time series heatmap slice (X', Y', Heat') where X', Y' are comprehensive coordinates and Heat' is a new keyword ranking. In one embodiment, the process uses a general auto-regressive model AR(n) or the following formulas to generate the time series heatmap slice:

$$X(t)=\alpha_1+W_{11}\times X(t-1)+W_{12}\times Y(t-1)+e_1(t-1)$$

$$Y(t)=\alpha_1+W_{21}\times X(t-1)+W_{12}\times Y(t-1)+e_1(t-1)$$

At step 650, the process creates a main topic new keyword heat list and a subtopic new keyword heat list to rank new keywords found in new news articles. In one embodiment, the process uses the following formula to rank new incoming keywords where H(t) is heat in time t:

$$H(t)=\alpha+W\times H(t-1)+e(t-1)$$

At step 660, the process sets one or more influence factors for the subtopic heat to influence the main topic heat prediction. For example, referring to FIG. 9, the main topic "The World Cup" has a heat prediction that increases based on the heat predictions of its subtopics. In one embodiment, the main topic new keyword heat list corresponds to a main topic new keyword heat value, the subtopic new keyword heat list corresponds to a subtopic new keyword heat value, and the subtopic new keyword heat value influences the main topic new keyword heat value based on the one or more influence factors.

Figure 10:
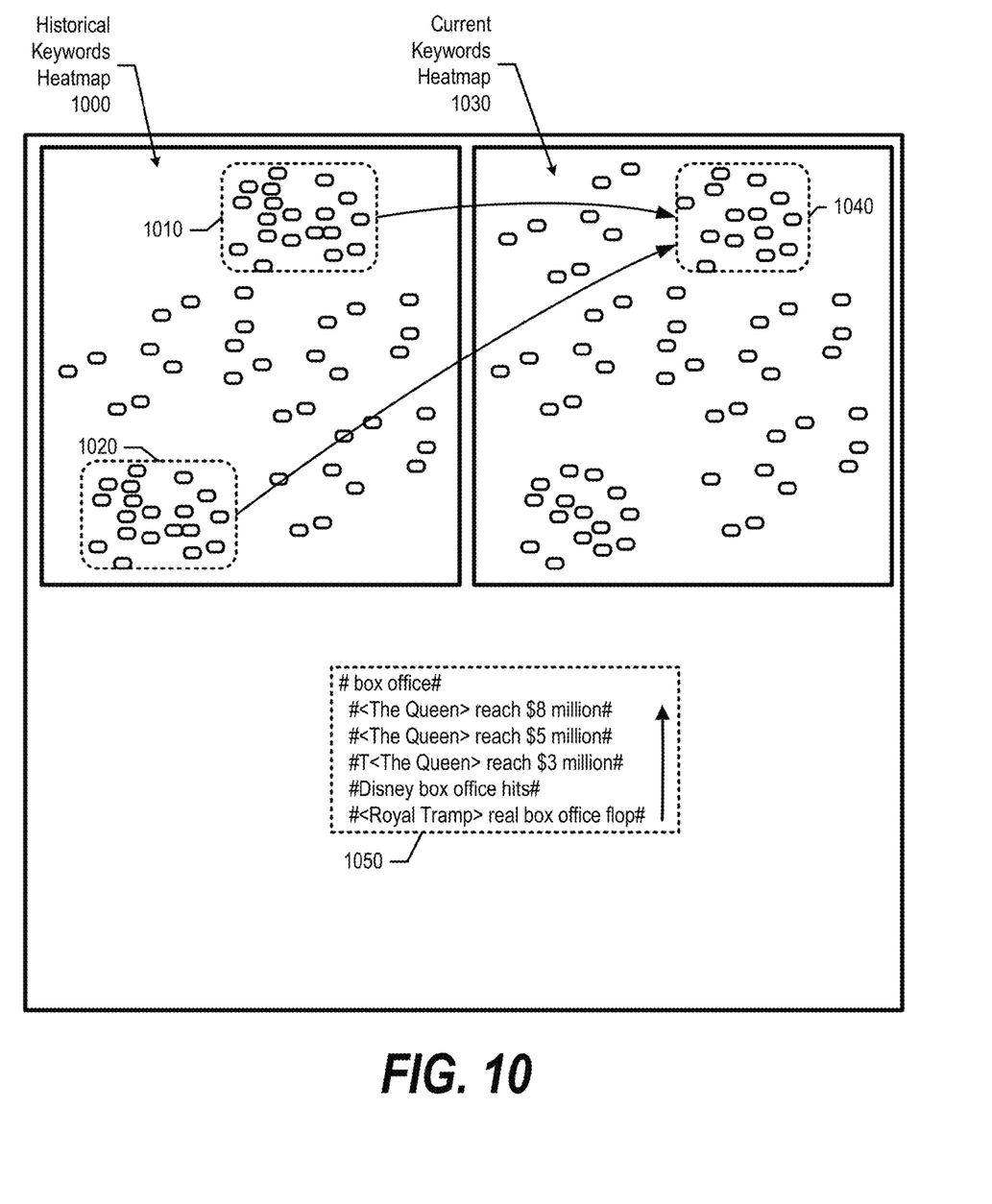
FIG. 10 is an exemplary diagram depicting a historical keyword heatmap and current keyword heatmap that merges subtopic groupings into a main topic grouping.

At step 670, the process uses unidirectional linear relations to adjust, gather, and/or purge keywords as needed to finalize the time series prediction model at step 680. For example, FIG. 10 shows that the subtopics are gathered into the main topic "box office." In one embodiment, system 300 uses the steps shown in FIG. 6 to also dynamically tune the time series prediction model over time. FIG. 6 processing thereafter returns to the calling routine (see FIG. 4) at 695.

Figure 7:
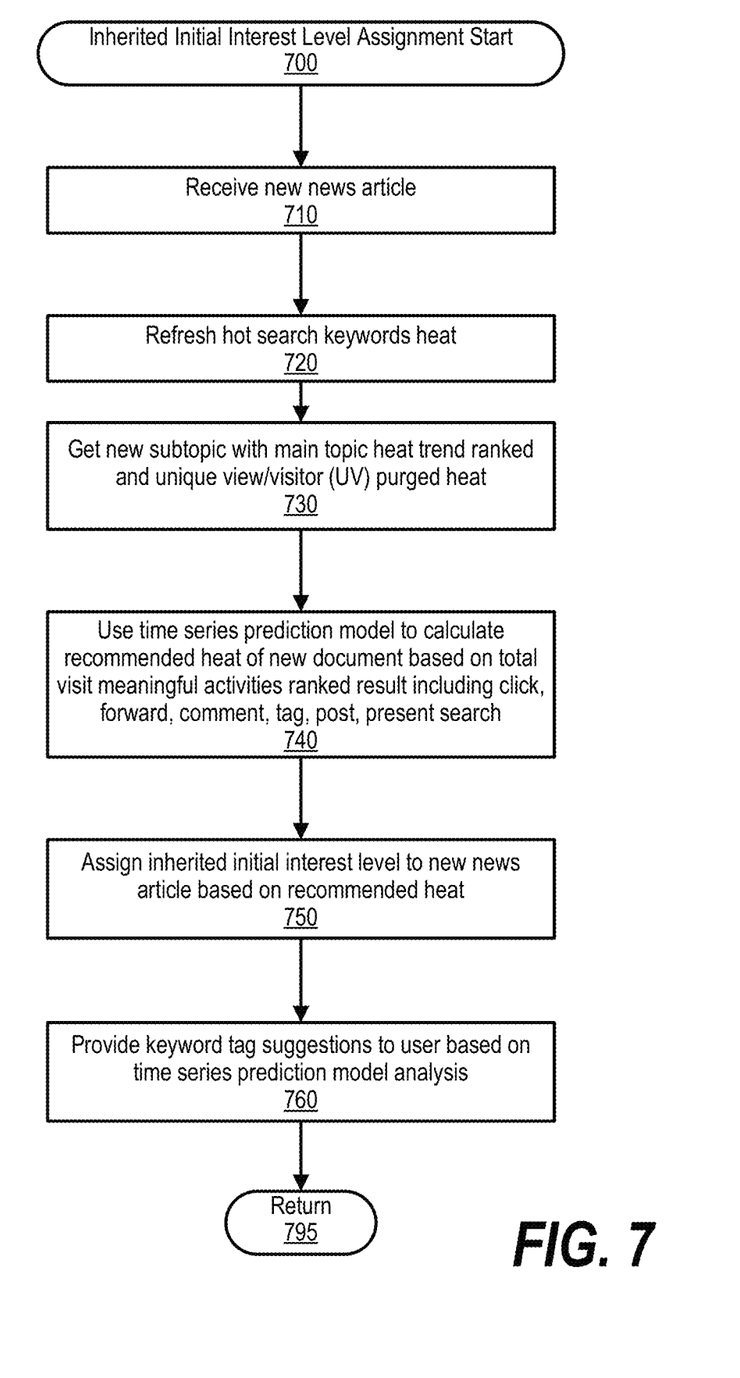
FIG. 7 is an exemplary flowchart depicting steps taken to assign accumulated heat (inherited initial interest levels) to new news articles.

FIG. 7 is an exemplary flowchart depicting steps taken to assign accumulated heat (inherited initial interest levels) to new news articles. FIG. 7 processing commences at 700 whereupon, at step 710, the process receives a new news article (news article x 320) and, at step 720, the process refreshes the heat of hot search keywords based on new interest (e.g., clicks, etc.). In one embodiment, in a time series, the process sets start and end times and a time window as basic variables using the following formula to generate new heat values:

$$\text{new Heat} = \sum_{k=1}^{n}\binom{n}{k}(H)_{-uv}$$

At step 730, the process identifies new subtopic group and main topic group heat trends ranked and unique view/visitor (UV) purged heat. In one embodiment, the process not only uses UV data to measure or determine new heat, the process uses the UV data as a reference to ensure that the main topic calculation is accurate.

At step 740, the process uses time series prediction model 308 to calculate a recommended heat of the new news article based on new keywords in the new news article using the formula: Recommended Heat=Total (click+forward+comment+tag post+search present).

At step 750, the process assigns the inherited initial interest level to the new news article based on the calculated recommended heat. At step 750, the process provides keyword tag suggestions 330 to user 310 for the user to increase the new news article's inherited initial interest level on a subsequent analysis. In one embodiment, the process calculates a correlation with known terms in an existing list (includes initial training tags) to generate tag suggestions 330. FIG. 7 processing thereafter returns to the calling routine (see FIG. 4) at 795.

FIG. 8 is an exemplary diagram depicting various phrase groupings, adjustments, and purges during keyword analysis and grouping. Group 800 includes a list of keywords and phrases with a main topic and subtopic structure. The approach described herein reorganizes the phrases according to interest level and also purges certain outlier phrases to reduce computational complexity. Group 820 shows that certain phrases from group 800 are reorganized according to interest level, and phrase 825 and 830 will be purged to reduce computational complexity because of their irrelevance to the overall grouping.

Group 840 is another example of main topic/subtopic phrases where the phrases are related based on their context. Group 860 is a complement to group 820 that show some words in a contrary (anxious) state. As such, when a purge is performed on phrases 825 and 830, the words in the contrary state may still be kept in the calculations.

Figure 9:
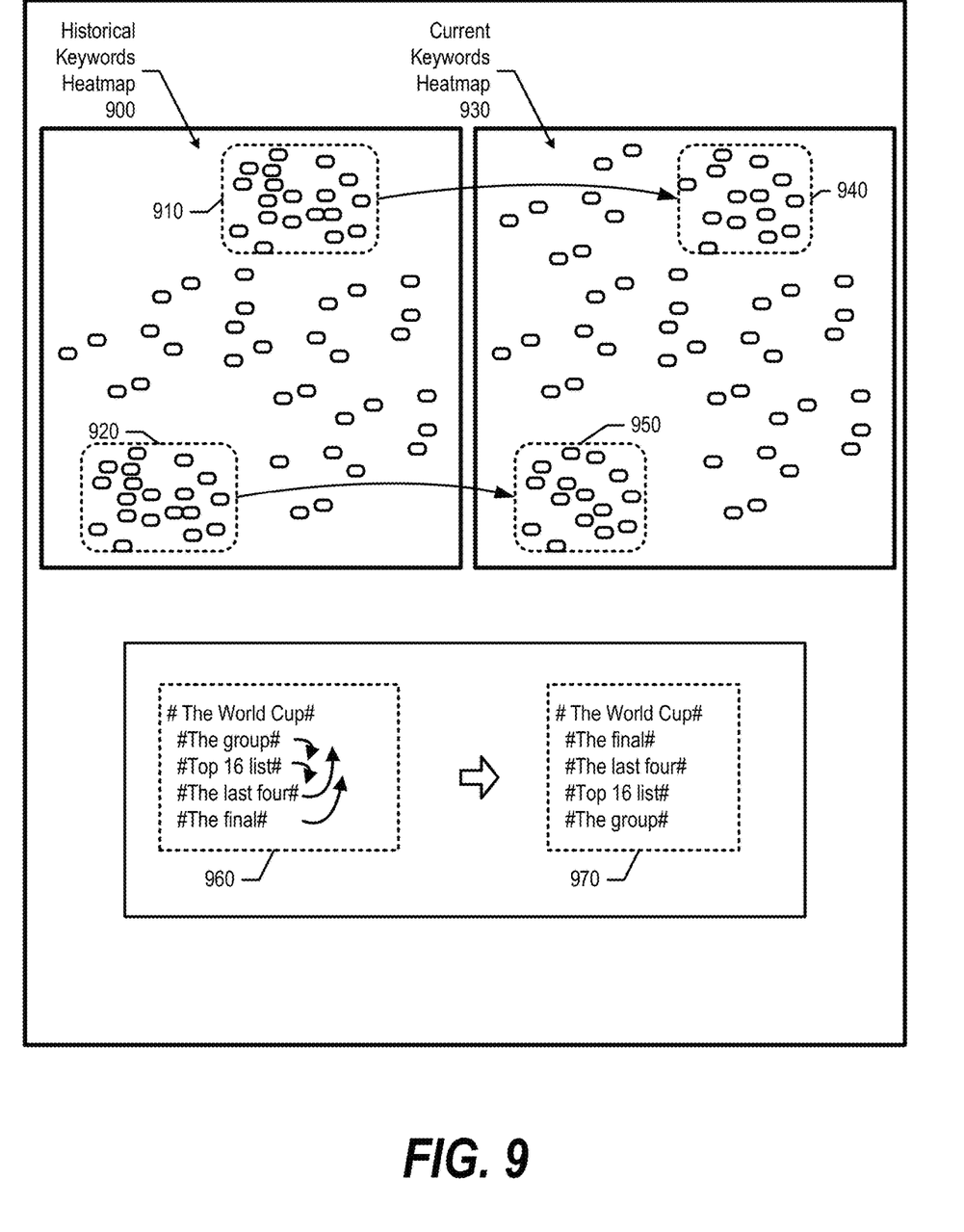
FIG. 9 is an exemplary diagram depicting a historical keyword heatmap and a linearly related current keyword heatmap with corresponding keyword groupings.

FIG. 9 is an exemplary diagram depicting a historical keyword heatmap and a linearly related current keyword heatmap with corresponding keyword groupings. FIG. 9 shows that historical keywords heatmap 900 includes groupings 910 and 920. These groupings are mapped over to current keywords heatmap 930's groups 940 and 950. FIG. 9 shows the linear relationship between grouping 910 and grouping 940, and between grouping 920 and grouping 950.

In one embodiment, news article analyzer 305 continuously collects data to generate the current heat and make predictions using time series prediction model 308. Heatmaps 900 and 930 may represent a beginning state and a prediction state that time series prediction model 308 predicts with a heat map slice in the corresponding time series windows. Groups 960 and 970 show an example of a heat change. Group 960 includes #The World Cup# as the main topic and #the group#, #top 16 list#, #the last four#, and #the final# are subtopics of #The World Cup#. During keyword analysis, #the final# subtopic and #the last four# subtopic are more popular and, in turn are re-organized into group 970.

FIG. 10 is an exemplary diagram depicting a historical keyword heatmap and current keyword heatmap that merges subtopic groupings into a main topic group. FIG. 10 shows that historical keywords heatmap 1000 includes main topic group 1010 and subtopic group 1020, which are both mapped over to main topic group 1040 in current keywords heatmap 1030. FIG. 10 shows that the historical subtopic keywords map into current main topic keywords. Group 1050 shows an example where the subtopic phrases are merged into the main topic phrase "box office."

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
building a time series prediction model based on one or more relationships between a first set of keywords in a set of first news articles and a second set of keywords in a set of second news articles, wherein the time series prediction model comprises a time-based interest level adjustment corresponding to a publication time between the set of first news articles and the set of second news articles;
computing, by the time series prediction model, an inherited initial interest level of a third news article comprising a set of new keywords based on the set of new keywords and the time-based interest level adjustment; and
assigning the inherited initial interest level to the third news article.

2. The method of claim 1 wherein the first set of keywords is a set of historical keywords, the set of first news articles is a set of historical news articles, the second set of keywords is a set of current news articles, the set of second news articles is a set of current news articles, and the third news article is an unpublished news article.

3. The method of claim 2 further comprising:
grouping the set of historical keywords into a first set of topic groups comprising at least one first main topic group and at least one first subtopic group;
grouping the set of current keywords into a second set of topic groups comprising at least one second main topic group and at least one second subtopic group; and
identifying the one or more relationships based on mapping the first set of topic groups to the second set of topic groups.

4. The method of claim 3 further comprising:
calculating a split keyword distance threshold and a long distance keyword threshold;
purging one or more of the set of current keywords from the second set of topic groups based on the split keyword distance threshold; and
purging one or more of the set of current keywords from the second set of topic groups based on the long distance keyword threshold.

5. The method of claim 3 further comprising:
defining a first set of coordinates and a first interest level of the first set of topic groups;
defining a second set of coordinates and a second interest level of the second set of topic groups;
determining a baseline interest level and the time-based interest level adjustment based on analyzing the first interest level against the second interest level;
generating a time series heat map slice based on the baseline interest level and the time-based interest level adjustment; and
building the time series prediction model using the time series heat map slice.

6. The method of claim 5 further comprising:
creating a main topic new keyword heat list and a subtopic new keyword heat list, wherein the main topic new keyword heat list corresponds to a main topic new keyword heat value and the subtopic new keyword heat list corresponds to a subtopic new keyword heat value;
configuring one or more influence factors for the subtopic new keyword heat value to influence the main topic new keyword heat value; and
integrating the main topic new keyword heat list, the subtopic new keyword heat list, and the one or more influence factors into the time series prediction model.

7. The method of claim 5 further comprising:
refreshing the baseline interest level in response to receiving the third news article; and
using the refreshed baseline interest level by the time series prediction model during the computing of the inherited initial interest level.

8. The method of claim 1 further comprising:
providing a list of recommended keywords to an author of the third news article in response based on the time series prediction model analyzing the third news article.

9. The method of claim 1 further comprising:
retrieving the third news article by a news aggregator service; and
assigning, by the news aggregator service, a page view placement to the third news article based on the inherited initial interest level.

10. An information handling system comprising:
one or more processors;
a memory coupled to at least one of the processors;
a set of computer program instructions stored in the memory and executed by at least one of the processors in order to perform actions of:
building a time series prediction model based on one or more relationships between a first set of keywords in a set of first news articles and a second set of keywords in a set of second news articles, wherein the time series prediction model comprises a time-based interest level adjustment corresponding to a publication time between the set of first news articles and the set of second news articles;
computing, by the time series prediction model, an inherited initial interest level of a third news article comprising a set of new keywords based on the set of new keywords and the time-based interest level adjustment; and
assigning the inherited initial interest level to the third news article.

11. The information handling system of claim 10 wherein the first set of keywords is a set of historical keywords, the set of first news articles is a set of historical news articles, the second set of keywords is a set of current news articles, the set of second news articles is a set of current news articles, and the third news article is an unpublished news article.

12. The information handling system of claim 11 wherein the processors perform additional actions comprising:
grouping the set of historical keywords into a first set of topic groups comprising at least one first main topic group and at least one first subtopic group;
grouping the set of current keywords into a second set of topic groups comprising at least one second main topic group and at least one second subtopic group; and
identifying the one or more relationships based on mapping the first set of topic groups to the second set of topic groups.

13. The information handling system of claim 12 wherein the processors perform additional actions comprising:
calculating a split keyword distance threshold and a long distance keyword threshold;
purging one or more of the set of current keywords from the second set of topic groups based on the split keyword distance threshold; and
purging one or more of the set of current keywords from the second set of topic groups based on the long distance keyword threshold.

14. The information handling system of claim 12 wherein the processors perform additional actions comprising:
defining a first set of coordinates and a first interest level of the first set of topic groups;
defining a second set of coordinates and a second interest level of the second set of topic groups;
determining a baseline interest level and the time-based interest level adjustment based on analyzing the first interest level against the second interest level;
generating a time series heat map slice based on the baseline interest level and the time-based interest level adjustment; and
building the time series prediction model using the time series heat map slice.

15. The information handling system of claim 14 wherein the processors perform additional actions comprising:
creating a main topic new keyword heat list and a subtopic new keyword heat list, wherein the main topic new keyword heat list corresponds to a main topic new keyword heat value and the subtopic new keyword heat list corresponds to a subtopic new keyword heat value;
configuring one or more influence factors for the subtopic new keyword heat value to influence the main topic new keyword heat value; and
integrating the main topic new keyword heat list, the subtopic new keyword heat list, and the one or more influence factors into the time series prediction model.

16. The information handling system of claim 14 wherein the processors perform additional actions comprising:
refreshing the baseline interest level in response to receiving the third news article; and
using the refreshed baseline interest level by the time series prediction model during the computing of the inherited initial interest level.

17. The information handling system of claim 10 wherein the processors perform additional actions comprising:
providing a list of recommended keywords to an author of the third news article in response based on the time series prediction model analyzing the third news article;
retrieving the third news article by a news aggregator service; and
assigning, by the news aggregator service, a page view placement to the third news article based on the inherited initial interest level.

18. A computer program product stored in a computer readable storage medium, comprising computer program code that, when executed by an information handling system, causes the information handling system to perform actions comprising:
building a time series prediction model based on one or more relationships between a first set of keywords in a set of first news articles and a second set of keywords in a set of second news articles, wherein the time series prediction model comprises a time-based interest level adjustment corresponding to a publication time between the set of first news articles and the set of second news articles;
computing, by the time series prediction model, an inherited initial interest level of a third news article comprising a set of new keywords based on the set of new keywords and the time-based interest level adjustment; and
assigning the inherited initial interest level to the third news article.

19. The computer program product of claim 18 wherein the first set of keywords is a set of historical keywords, the set of first news articles is a set of historical news articles, the second set of keywords is a set of current news articles, the set of second news articles is a set of current news articles, and the third news article is an unpublished news article.

20. The computer program product of claim 19 wherein the information handling system performs further actions comprising:
grouping the set of historical keywords into a first set of topic groups comprising at least one first main topic group and at least one first subtopic group;
grouping the set of current keywords into a second set of topic groups comprising at least one second main topic group and at least one second subtopic group; and
identifying the one or more relationships based on mapping the first set of topic groups to the second set of topic groups.

21. The computer program product of claim 20 wherein the information handling system performs further actions comprising:
calculating a split keyword distance threshold and a long distance keyword threshold;
purging one or more of the set of current keywords from the second set of topic groups based on the split keyword distance threshold; and
purging one or more of the set of current keywords from the second set of topic groups based on the long distance keyword threshold.

22. The computer program product of claim 20 wherein the information handling system performs further actions comprising:
defining a first set of coordinates and a first interest level of the first set of topic groups;
defining a second set of coordinates and a second interest level of the second set of topic groups;
determining a baseline interest level and the time-based interest level adjustment based on analyzing the first interest level against the second interest level;
generating a time series heat map slice based on the baseline interest level and the time-based interest level adjustment; and building the time series prediction model using the time series heat map slice.

23. The computer program product of claim 22 wherein the information handling system performs further actions comprising:
creating a main topic new keyword heat list and a subtopic new keyword heat list, wherein the main topic new keyword heat list corresponds to a main topic new keyword heat value and the subtopic new keyword heat list corresponds to a subtopic new keyword heat value;
configuring one or more influence factors for the subtopic new keyword heat value to influence the main topic new keyword heat value; and
integrating the main topic new keyword heat list, the subtopic new keyword heat list, and the one or more influence factors into the time series prediction model.

24. The computer program product of claim 18 wherein the information handling system performs further actions comprising:
refreshing the baseline interest level in response to receiving the third news article; and
using the refreshed baseline interest level by the time series prediction model during the computing of the inherited initial interest level.

25. The computer program product of claim 18 wherein the information handling system performs further actions comprising:
providing a list of recommended keywords to an author of the third news article in response based on the time series prediction model analyzing the third news article;
retrieving the third news article by a news aggregator service; and
assigning, by the news aggregator service, a page view placement to the third news article based on the inherited initial interest level.

* * * * *